Jan. 3, 1967        D. C. CHAPMAN ET AL        3,295,827
VARIABLE CONFIGURATION BLADE
Filed April 6, 1966
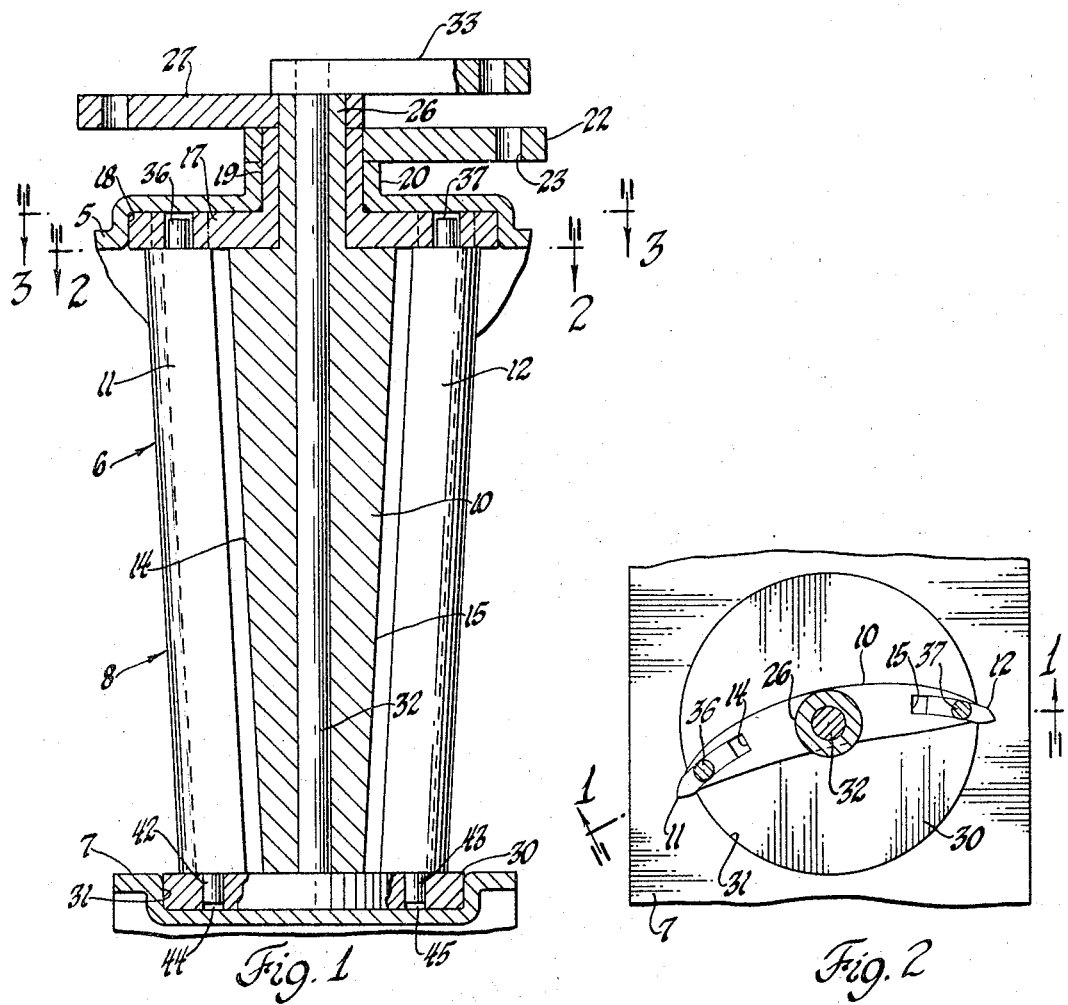
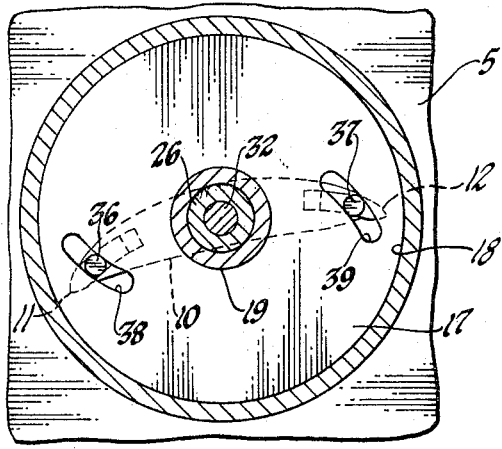
INVENTORS
Dennis C. Chapman,
Kenneth O. Johnson,
& Salvatore A. Sgroi
BY Paul Fitzpatrick
ATTORNEY United States Patent Office 3,295,827
Patented Jan. 3, 1967

3,295,827
VARIABLE CONFIGURATION BLADE
Dennis C. Chapman, Greenfield, and Kenneth O. Johnson and Salvatore A. Sgroi, Indianapolis, Ind., assignors to General Motors Corporation, Detroit, Mich., a corporation of Delaware
Filed Apr. 6, 1966, Ser. No. 540,647
6 Claims. (Cl. 253—78)

Our invention is directed to blades or vanes of variable configuration for use in fluid dynamic machines and in other installations where bodies of airfoil configuration operate upon moving fluids. More specifically, in its preferred embodiment, the invention is a variable configuration vane for an axial-flow compressor. Among the parameters which define the form and effect of a vane or blade are its length or span, its width or chord, its thickness, its setting or stagger angle, and its curvature or camber angle. These influence the angle of turning, deviation, and incidence of the blade.

A structure such as a stator vane ring for a compressor comprises an annular cascade of vanes having spans radial to the axis of the compressor and customarily mounted between outer and inner rings which may be termed shrouds. It is common to provide means to vary the stagger angle of such vanes to accommodate varying flow conditions in a compressor. Structures including blades or vanes which are variable in camber angle or in chord have also been proposed.

According to our invention, it is possible to provide a vane or an array or cascade of vanes with variable stagger angle, variable chord, and variable camber angle, and in which these parameters may be varied differentially between the two ends of the vane. Differential variation of stagger angle at the ends of the vane varies the twist of the vane. Of course, the structure which provides for these variations of vane configuration may be employed to provide only some modes of adjustment.

The principal object of the invention is to provide a vane having very flexibly adjustable geometry with simple and reliable mechanical structure.

The nature of the invention and its advantages will be apparent to those skilled in the art from the succeeding detailed description of the preferred embodiment of the invention and the accompanying drawings thereof.

FIGURE 1 is a sectional view, taken generally radially through one vane, of a compressor stator ring, the section being taken on an arcuate plane corresponding to the mean camber plane of a vane as indicated by the line 1—1 in FIGURE 2.

FIGURE 2 is a sectional view of the same taken on the plane indicated by the line 2—2 in FIGURE 1.

FIGURE 3 is a sectional view of the same taken on the plane indicated by the line 3—3 in FIGURE 1.

In the drawings, a compressor case 5, which may be typically cylindrical or conical and which is shown fragmentarily, encloses a vane ring 6 including an inner shroud ring 7 and vanes 8. The vanes, which are generally of airfoil configuration, comprise a body 10, a leading edge strip 11, and a trailing edge strip 12. The edge strips are mounted respectively in slots 14 and 15 at the leading and trailing edges of the body so that these strips can move chordwise of the vane; in other words, be moved more or less deeply into the slots 14 and 15. The slots are just enough wider than the strips so that the strips are guided and supported but can slide freely chordwise of the body. Thus, the body 10 and strips 11 and 12 define an airfoil with adjustable leading and trailing edges. The slots and the edge strips are curved so that the strips move in a generally circular arc path. As they are projected from the slots, the camber angle is increased as well as the chord.

The means for adjusting the edge strips comprises an outer circular cam 17 rotatable in a shallow cylindrical pocket 18 formed in the compressor case 5. Cam 17 is integral with a hollow stem 19 which extends through a hollow boss 20 concentric with the pocket 18. Cam 17 is rotated by an arm 22 suitably fixed to stem 19 and provided with means such as a bore 23 for connecting a suitable means for actuating the cam. The body 10 of the vane includes a hollow stem 26 extending through the stem 19 and coupled to an actuating arm 27. The actuation of the arm 27 by any suitable means rotates the vane about the axis of stem 26 to vary the setting angle of the vane. At the radially inner end of vane 8, an inner circular cam 30 is mounted in a circular socket 31 in the inner shroud. Cam 30 is integral with or fixed to a shaft 32 which extends through the length of vane body 10 and its stem 26 and mounts an adjusting arm 33 by which cam 30 may be rotated by suitable actuating means external to the case 5.

The edge strips 11 and 12 are coupled to cam 17 by pins 36 and 37, respectively, these cams being received in generally spiral slots 38 and 39 in cam 17. Similarly, the radially inner ends of the strips are provided with pins 42 and 43 which are fitted in cam slots 44 and 45 in the cam 30. These slots may be similar to slots 38 and 39 shown in FIGURE 3. The exact configuration of each of the four cam slots may be based upon a desired relation between movement of the arms 22 and 33 relative to arm 27 and the movement of the edge strips relative to the body of the vane. As will be apparent, if all of the arms 22, 27, and 33 are moved equally, the stagger angle of the vane is changed but its chord and camber angle remain constant. If either of arms 22 or 33 is moved relative to arm 27, which controls the body of the vane, the edge strips 11 and 12 are moved in the slots 14 and 15, changing camber and chord at the corresponding end of the vane. It is possible, therefore, to vary the taper of the blade. For example, if cam 17 is rotated while the vane and cam 30 remain stationary, strips 11 and 12 are moved outwardly, swinging about the pins 42 and 43 as pivots at the inner end. The reverse action also is possible. In most cases, however, it is contemplated that the chord be changed concurrently at both ends of the vane.

It is apparent, therefore, that the structure illustrated here provides a very flexible configuration of vane or vane ring. Since the general nature of vane rings and of actuating means therefor is generally known, no actuators are shown connected to the arms 22, 27, and 33. Such actuating means may be of the nature of those illustrated in United States Patents No. 2,857,092 of R. H. Campbell and No. 2,862,654 of A. W. Gardner. It will be appreciated, of course, that many other mechanical arrangements to rotate shafts or spindles 32, 26, and 19 could be provided; also, that the shafts may be actuated from either end or partly from both ends of the vanes, if this is considered desirable in a particular installation.

The detailed description of the preferred embodiment of the invention to explain the principles thereof is not to be considered as limiting the invention, since many modifications may be made by the exercise of skill in the art.

We claim:
1. A variable configuration vane or blade for a turbomachine comprising, in combination,
a body generally of airfoil configuration,
means mounting the body for rotation about an axis extending spanwise of the body,
means for rotating the body about the said axis,
an adjustable leading edge strip, means mounting the leading edge strip on the body guiding the strip for movement chordwise of the body, an adjustable trailing edge strip, means mounting the trailing edge strip on the body guiding the strip for movement chordwise of the body, and means rotatable about the said axis coupled to the ends of the strips to move the strips chordwise of the body in response to relative rotation of the said means and the body.

2. A combination as recited in claim 1 in which the said rotatable means includes first means rotatable about the said axis at one end of the vane coupled to the adjacent ends of the strips to move the strips chordwise of the body in response to relative rotation of the first means and the body and second means rotatable about the said axis at other end of the vane coupled to the adjacent ends of the strips to move the strips chordwise of the body in response to relative rotation of the second means and the body.

3. A combination as recited in claim 2 including also setting means extending from the second rotatable means through the vane and the first rotatable means.

4. A combination as recited in claim 2 in which the said rotatable means are cams.

5. A combination as recited in claim 2 in which the said rotatable means are independently rotatable.

6. A combination as recited in claim 1, the body being cambered and the said means guiding the said strips for movement in arcuate paths so that such movement of the strips alters both the chord and the camber angle of the vane.

References Cited by the Examiner

UNITED STATES PATENTS 1,544,288   6/1925   Ormer _____ 253—78

FOREIGN PATENTS 223,946   3/1958   Australia.

MARTIN P. SCHWADRON, *Primary Examiner.*

E. A. POWELL, *Assistant Examiner.*